United States Patent [19]
Eaton et al.

[11] 3,968,688
[45] July 13, 1976

[54] LIQUID LEVEL GAUGE

[75] Inventors: John L. Eaton, Delanco, N.J.; John C. Fagan, Philadelphia, Pa.

[73] Assignee: SCM Corporation, New York, N.Y.

[22] Filed: June 24, 1974

[21] Appl. No.: 482,505

[52] U.S. Cl. ................................................. 73/328
[51] Int. Cl.² ........................................ G01F 23/02
[58] Field of Search ................. 73/290 R, 305, 323, 73/325, 328, 427, 431, 329; 85/37, 32.1

[56] References Cited
UNITED STATES PATENTS

| | | |
|---|---|---|
| 2,718,147 | 9/1955 | Wilson .................................. 73/328 |
| 2,994,933 | 8/1961 | Wolfe .................................. 85/37 X |
| 3,049,922 | 8/1962 | Schwaneke .......................... 73/323 |
| 3,641,967 | 2/1972 | Charbonneaux .................. 73/431 X |
| 3,765,249 | 10/1973 | Bissell ................................ 73/431 |
| 3,886,796 | 6/1975 | Gruett ................................ 73/328 |

Primary Examiner—Richard C. Queisser
Assistant Examiner—John S. Appleman
Attorney, Agent, or Firm—Milton Wolson; Saul Leitner; Ernest F. Weinberger

[57] ABSTRACT

A liquid level gauge having at least one transparent wall and a base wall on the exterior of a vessel. The gauge is secured to and communicates with the interior of the vessel by an eyelet connecting adjacent ports in the gauge and the vessel.

3 Claims, 3 Drawing Figures

LIQUID LEVEL GAUGE

BACKGROUND OF THE INVENTION

1. Field of the Invention

The present invention relates generally to liquid level gauges and more specifically to a liquid level gauge in combination with a vessel.

2. Description of the Prior Art

In the field of household appliances, certain liquid reservoirs have included a sight glass liquid gauge which overlies a relatively large opening in the side of the liquid reservoir to conveniently show the amount of liquid contained therein. In many of these gauges, the opening is equivalent to the height of the expected water level to be observed. Using such an extended opening increases the surface area which must be sealed between the sight glass and the vessel wall, thus reducing the reliability of the seal and decreasing the life of the appliance.

Commercial appliances, for example large coffee urns, have used an external column communicating with the reservoir by at least one (if not two) pipe connections which are physically separated from the vessel. This type of liquid level gauge has been found satisfactory in the commercial market, yet has not been satisfactorily incorporated into smaller household appliances. The reason for this lack of incorporation of the principle into the smaller appliances is the expense involved in the connection between the column and the body of the reservoir. Similarly, household appliances are generally made of thin walled steel and thus are not capable of being threaded so as to receive the pipe connection between the reservoir and the liquid level column. Also, in household appliances, the use of an external column physically separated from the vessel provides an object which is easily broken in every-day ordinary use.

Thus, there exists a need in the small appliance area (specifically, coffee percolators, coffee urns, steam irons, etc.) for an efficient and long-lasting liquid level gauge. Since the gauges are generally extra features for the convenience of the consumer and do not necessarily vary the specific function of the household appliance, the expense of the appliance should not be unduly increased by the type of gauge used. Thus, the gauge to be incorporated into this smaller appliance must be economical in the number of parts used and in its process of assembly.

OBJECTS OF THE INVENTION

A primary object of this invention is to provide a reliable and economical liquid level gauge for household appliances.

Another object of the present invention is to minimize the seal area between the liquid level gauge and the vessel.

A further object of the invention is to provide a liquid level gauge in combination with a liquid vessel which will not decrease the life of the vessel due to breakage or seepage around the seals.

A still further object of the invention is the elimination of threaded parts for attaching a liquid gauge to a vessel.

The objects outlined above, as well as other objects and features of the present invention, are accomplished by a liquid level gauge having at least one transparent wall and a base wall on the exterior of a vessel. The liquid level gauge is secured to and communicates with the interior of the liquid bearing vessel by an eyelet which connects adjacent ports in the base wall of the gauge and the vessel. The eyelet has a flange on each end which engages the vessel wall and the base wall of the gauge and secures them to each other. The transparent wall of the gauge, which may have indicia thereon, has an integrally formed flange extending therefrom which is secured to the base wall of the gauge. The base wall of the gauge has a slot therein to receive the flange from the transparent wall and also has an integrally formed flange of its own which circumscribes the flange of the transparent wall. The base wall of the gauge also has a recess therein to receive a gasket which encompasses the eyelet and provides a sealing engagement of the base wall to the vessel wall. The transparent wall is secured and sealed to the base wall of the gauge by liquid tight adhesive sealants, solvent bonding or other sealing methods.

Though the invention is described as generally being used in thin metallic walled vessels which include electrical appliances, the liquid level gauge of the present invention may also be used with thick walled vessels or any liquid bearing vessels.

DESCRIPTION OF THE PREFERRED EMBODIMENTS

Figure 2:
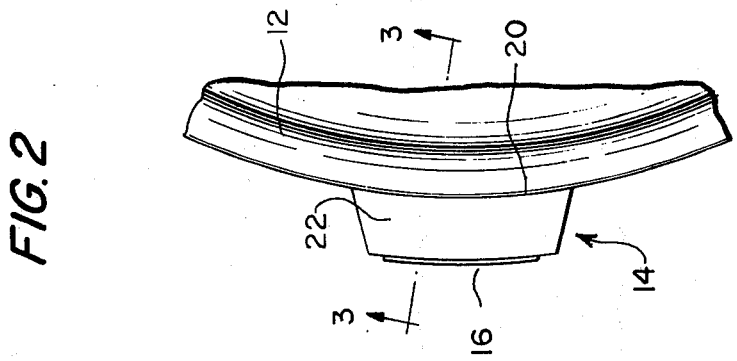
FIG. 2 is a partial section view taken along lines 2—2 of FIG. 1.
Figure 3:
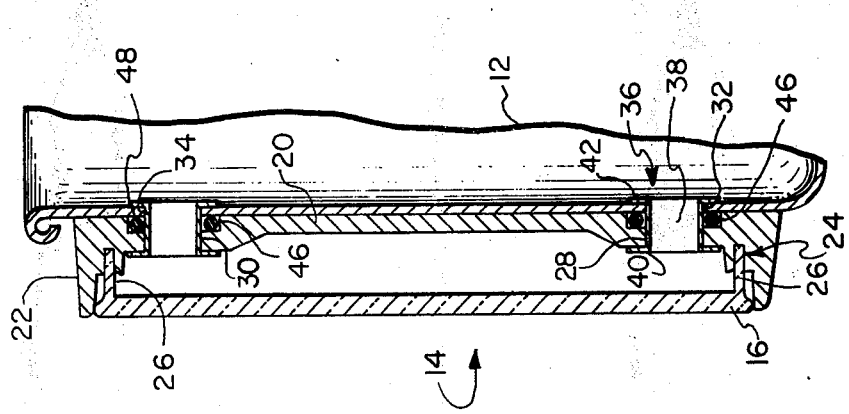
FIG. 3 is a partial sectional view taken along lines 3—3 of FIG. 2.
Figure 1:
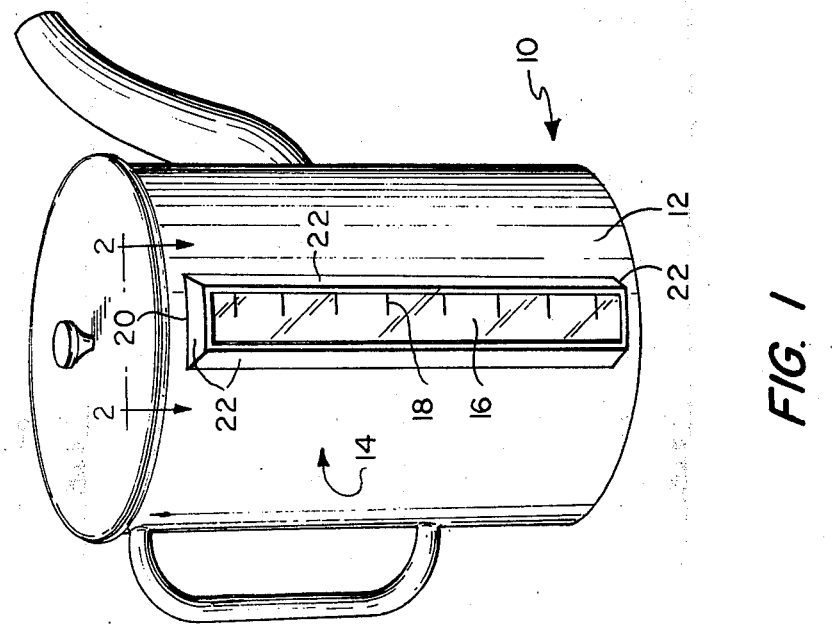
FIG. 1 is a perspective view of the liquid level gauge of the present invention in combination with an appliance.

Referring now to FIGS. 1–3, an appliance (for example, a coffee pot) is shown having a thin metal (stainless steel, for example) wall 12 with a preferred embodiment of the liquid level gauge 14 secured thereto. The wall 12 is generally from 10 mils to 30 mils thick. Although being shown for a coffee pot, the following description is also applicable to other liquid bearing vessels or reservoirs and may also be applied to non-metallic and thick walled vessels. The subject invention is most useful with thin walled vessels wherein the wall is so thin that it generally may not be used as part of the fastening or securing means for the liquid level gauge or its connecting hardware.

The liquid level gauge 14 has a generally trapezoidal cross-section having a transparent wall 16 and a base wall 20 which has the general curvature of the vessel wall 12 to which the liquid level gauge is secured. The transparent wall may have indicia 18 thereon. The wall 20, shown specifically in FIGS. 2 and 3, engages the wall 12 of the vessel along the length of the gauge 14. The gauge 14 may be made from molded plastic and the indicia 18 may be placed thereon using a decal, paint, hot stamp material or similar well known techniques of the prior art.

Extending from base wall 20 is an integrally formed flange 22. A slot 24 is also provided in the base wall 20 running adjacent the interior of the flange 22. The transparent wall 16 also has an integrally formed flange 26 extending therefrom and received within slot 24 of the base 20. The flange 26 is interior to flange 22 and is circumscribed thereby. Transparent wall 16 is secured in a liquid tight relationship to the base 20 using preferably a liquid tight adhesive sealant or solvent bonding to secure flange 26 in slot 24. Other methods of securing include ultrasonic and heat bonding or any known mechanical fasteners in combination with a gasket.

The liquid level gauge 14 communicates with the interior of the vessel 10 by apertures 28 and 30 near the bottom and top of base wall 20, respectively, and ports 32 and 34 near the top and bottom of wall 12, respectively, of the vessel 10. Apertures 28 and 30 are adjacent to ports 32 and 34, respectively, and are generally of the same cross-sectional dimensions. A hollow fastener or eyelet 36 is provided to both fluidly and structurally connect the water level gauge 14 and the vessel 10 to each other. The eyelet 36 has a main body portion 38 which traverses apertures 28 and 30 and ports 30 and 34. Flange portions 40 and 42 extend from the ends of body portion 36 and engage the interior surface of wall 20 of the liquid level gauge and the interior surface of wall 12 of the vessel 10, respectively. Thus, the eyelet 36 compressively secures the liquid level gauge to the liquid bearing vessel and provides direct communication between the interior of the vessel and the interior of the gauge.

As shown in FIG. 3, a pair of recesses 46 are provided in wall 20 in which a resilient deformable gasket 48 is provided in each recess 46 to encompass the eyelet body portion 38 and provide a sealing engagement between wall 20 of the liquid level gauge, wall 12 of the vessel and the eyelet 36.

The liquid level gauge of the present invention is assembled to the vessel 10 by aligning apertures 28 and 30 with corresponding ports 32 and 34 with gaskets 48 in recesses 46. The base wall 20 is secured to the vessel wall 12 by inserting the eyelet body 38 through the aligned apertures, ports and gaskets and forming the flange edges 40 and 42 thereon. Obviously, an eyelet having one preformed flange may be used. Thereafter, the front transparent wall 16 is secured to the base wall 20 by the adhesive or bond described above. Alternatively, the total gauge 14 including transparent wall 16 and base wall 20 may be integrally formed as a single unit using known molding techniques.

As can be seen from this description, the liquid level gauge of the present invention uses a minimum number of parts and inexpensive materials. The liquid level gauge is preferably formed from two molded pieces of plastic being joined to the wall of a vessel by two metal eyelets and being surrounded by two resilient gaskets. By using small ports instead of a long continuous opening in the side of a vessel, the peripheral area of the seal is reduced and thus the reliability and life of the vessel and liquid level gauge is increased. Though the present liquid level gauge is shown having a top and bottom ports or apertures, the device will work equally well using only one aperture near the bottom of the vessel 10 and the liquid level gauge 14 and an appropriate air outlet in the gauge.

From the preceding description of the preferred embodiments, it is evident that the objects of the invention are attained. Although the invention has been described and illustrated in detail, it is to be clearly understood that the same is by way of illustration and example only and is not to be taken by way of limitation. The spirit and scope of this invention are limited only by the terms of the appended claims.

What is claimed is:

1. A liquid level gauge for a generally cylindrical, thin-walled vessel comprising:
   a generally rectangular, hollow housing having at least one transparent wall and a separate base wall engaging and conforming to said vessel along the length thereof;
   said transparent wall having an integrally-formed flange extending therefrom;
   said base wall having a flange formed with an integral slot therein for receiving said flange of said transparent wall when said walls are assembled;
   a sealant securing said flange of said transparent wall to said base wall in a liquid tight manner;
   a port in said base wall adjacent a corresponding port near the bottom of said vessel; and
   an eyelet with a flange on each end engaging the interior surface of said vessel and the exterior surface of said base wall, respectively, for providing liquid communication between said vessel and said gauge and for securing said gauge to said vessel without substantially reducing the liquid opening defined by said ports.

2. The combination as in claim 1 wherein said vessel includes a second port in said side wall near the top of said vessel, said base wall includes an aperture near the top of said gauge, and a second eyelet for said second port and said second aperture.

3. The device of claim 1 wherein said base wall has a recess therein circumscribing said port and a gasket in said recess for circumscribing said eyelet and sealing the engagement of said base wall and said vessel.

* * * * *